Sept. 4, 1934. C. H. BENNINGTON ET AL Re. 19,299

HARMONICA

Original Filed Feb. 24, 1930

INVENTORS
Irving L. Stein
Charles H. Bennington
BY
J. Stuart Schorf
ATTORNEY

Reissued Sept. 4, 1934 Re. 19,299

UNITED STATES PATENT OFFICE 19,299

HARMONICA

Charles H. Bennington and Irving L. Stein, New York, N. Y., assignors to Harmatone Company, Inc., New York, N. Y., a corporation of New York Original No. 1,817,109, dated August 4, 1931, Serial No. 430,729, February 24, 1930. Application for reissue January 8, 1934, Serial No. 705,834

12 Claims. (Cl. 84—377)

This invention relates to musical instruments of the harmonica type.

Heretofore harmonicas were constructed with all the reeds affixed to a flat plate, and if one reed broke or otherwise got out of order the entire plate had to be removed for repairs.

The object of this invention is to provide a harmonica with each reed placed on a separate strip which can be removed and replaced by any person.

A further object of this invention is to provide a harmonica the body of which is constructed out of a single piece of metal with punched out portions for the wind to travel and a plurality of grooves to receive replaceable reed plates.

A further object of this invention is to provide a harmonica with replaceable reeds and a moveable mouthpiece which provides access to the removeable reeds.

Other objects and advantages will appear in the following specification, and the novel features of the invention will be particularly pointed out in the appended claims.

Our invention is illustrated in the accompanying drawing forming part of this application, and in which.

Figure 1:
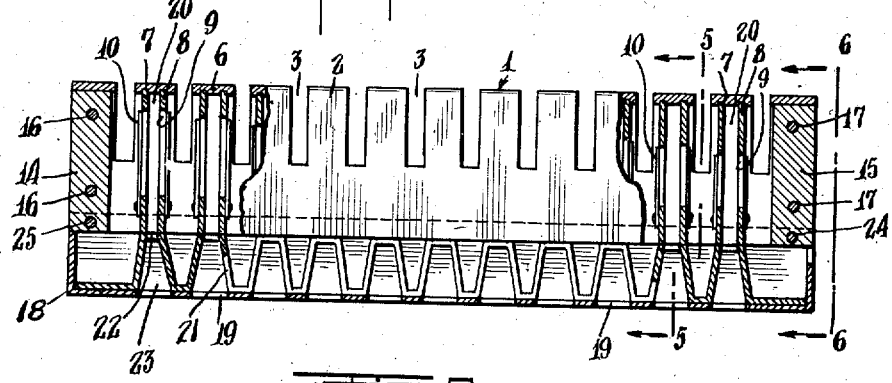
Figure 1 is a section view of the harmonica.
Figure 2:
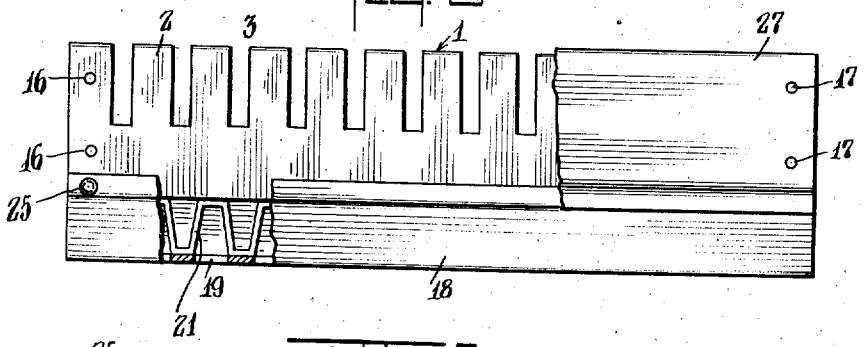
Figure 2 is a view partly in section of the harmonica.
Figure 3:
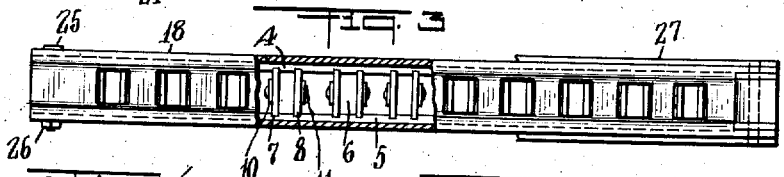
Figure 3 is an end view partly in section.

In the drawing the numeral 1, indicates a harmonica constructed out of a bent metal plate 2, which may be stamped out with slots 3, and formed into a V shape with sides 4 and 5 and 6.

The inside of the stamped V formed plate 2, provided with grooves 7. These grooves 7 are stamped in the same operation when the metal is slotted. The grooves 7, are arranged along each side of the slot 3.

Into the grooves 7, there are inserted removeable plates 8, made out of metal or any other material. These plates extend through the entire depth of the V formed plate 2. The plate 8 is also punched with an opening 9.

To the plate 8 there is attached by riveting or otherwise a reed 10 by means of rivet 11.

This reed has an enlarged head 12, but the remaining portion 13 of the reed 10, is adapted to vibrate loosely within the opening 9 of the plate 8 therefore the reed 10 is limited to the space within the opening 9 of the plate 8.

The reeds 10 and the corresponding openings 9, vary in length depending on the scale pitch in the harmonica.

At the ends of the plate 2 there are provided blocks 14 and 15, fastened to the plate 2, by means of rivets 16 and 17.

To the block 15, there is attached a mouthpiece 18, which has perforations 19, these perforations are opposite to the reed chambers 20, formed by the plate 2, the crest of the ridges of a corrugated metal, reed plate retainer strip 21, which is enclosed within the mouthpiece 18, the reed plates 8 and the reeds 10. Said retainer strip is provided with transverse slotted apertures 22 which extend through the top of the air chambers or wind passage 23 formed by the walls of said retainer strip and the longitudinal side walls of the mouthpiece 18, which slotted apertures are adapted to respectively register or communicate with the upper open ends of the various reed chambers.

The mouthpiece 18 revolves on the pin 24 and when in a closed position can be held by means of a small bolt 25 and nut 26.

The harmonica is provided with a cover 27, which is held down by the rivets 16 and 17, and covers the bottom of the mouthpiece 18.

Figure 4:
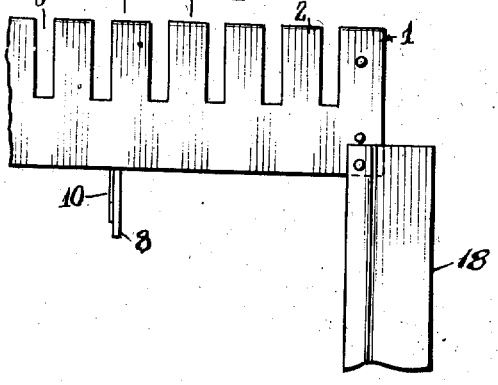
Figure 4 is a detail showing the revolving mouthpiece.
Figure 5:
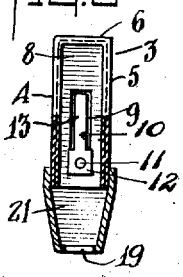
Figure 5 is a section taken on 5—5 of Figure 1.
Figure 6:
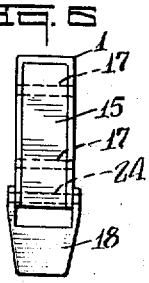
Figure 6 is an end view designated by 6—6 on Figure 1.

In operation, should one of the reeds 10 break or otherwise become out of order, the mouthpiece is disengaged by removing the bolt 26, and swung on the pivot 24, until the reed plates 8 are exposed as shown in Figure 4. The damaged reed plate is then extracted and a new reed plate inserted instead, and the mouthpiece then swung back to its original position.

As many changes could be made in the above construction and many apparently widely different embodiments of this invention could be made without departing from the scope thereof, it is intended that all matter contained in the above description or shown in the accompanying drawing, shall be interpreted as an illustrative and not in a limiting sense.

It is also to be understood that the language used in the following claims is intended to cover all of the generic and specific features of the invention herein described.

We claim:

1. In a harmonica, a body member having slots for wind passage which extend at an angle to the longitudinal axis of said body, grooves arranged within said body member adjacent to the margins of said slots and individual reed plates extending across the longitudinal axis of said body and adapted to removably fit within said grooves.

2. In a harmonica, a body member having slots for wind passage which intersect the longitudinal axis of said body member, grooves arranged within said body member adjacent to the margins of said slots, individual reed plates extending across the longitudinal axis of said body member and adapted to removably fit within said grooves and forming a series of reed chambers each extending across the longitudinal axis of the body member and a mouthpiece having a series of perforations therein, the spacing therebetween substantially corresponding to the spacing between said reed chambers and said perforations being adapted to communicate with the top apertures of said reed chambers.

3. In a harmonica, a horizontal body member having slots for wind passage, vertical grooves arranged at each end of each slot and individual reed plates adapted to removably fit within said grooves and each extending across the longitudinal axis of said body.

4. In a harmonica, a body member having slots for wind passage and having reed chambers each having opposing longitudinal walls and a bottom wall which are integral with each other, grooves arranged within said body member adjacent to said slots and individual reed plates, which extend across the longitudinal axis of the body, adapted to removably fit within said grooves.

5. In a harmonica, a body member having slots for wind passage, grooves arranged within said body member adjacent to said slots, individual reed plates adapted to removably fit within said grooves and forming reed chambers, the said chambers each having opposing longitudinal walls and a bottom wall which are integral with said body, and a movable mouthpiece.

6. In a harmonica, a horizontal body member having a longitudinal series of reed chambers therein and a longitudinal series of separated individual tone chambers alternately disposed with respect to said reed chambers, said body member having slots for wind passage into said chambers, vertical grooves arranged at each end of each slot and individual reed plates adapted to removably fit within said grooves.

7. In a harmonica, a body member having a longitudinal series of reed chambers and an alternating series of individual tone chambers, said longitudinal walls of said chambers all being integral with each other, said body member having slots for wind passage into said reed chambers, grooves arranged within said body member adjacent to said slots and individual reed plates adapted to removably fit within said grooves.

8. In a harmonica, a horizontal body member having a longitudinally disposed series of reed chambers, each having opposing longitudinal walls that are integral with each other and said body member having slots for wind passage, vertical grooves arranged at each end of each slot and individual reed plates adapted to removably fit within said grooves.

9. In a harmonica, a body member having slots for wind passage, grooves arranged within said body member adjacent to the margins of said slots and individual reed plates extending across the longitudinal axis of said body and adapted to removably fit within said grooves, said reed plates forming with said body a series of transversely disposed reed chambers.

10. In a harmonica, a body member having slots for wind passage, grooves arranged within said body member adjacent to the margins of said slots, individual reed plates extending across the longitudinal axis of said body member and adapted to removably fit within said grooves and forming a series of reed chambers each extending across the longitudinal axis of the body member and a mouthpiece having a series of perforations therein, the spacing therebetween substantially corresponding to the spacing between said reed chambers and intermediate individual chambers positioned respectively between perforations and the top of said reed chambers.

11. In a harmonica, a horizontal body member having slots for wind passage, which slots extend across the longitudinal axis of said body member, vertical grooves arranged at each end of each slot and individual reed plates adapted to removably fit within said grooves and form a longitudinal series of transversely extending reed chambers; and individual tone chambers interposed respectively between said reed chambers.

12. In a harmonica, a body member having slots for wind passage, grooves arranged within said body member adjacent to said slots and transversely extending individual reed plates adapted to fit within said grooves and form with said body a longitudinal series of reed chambers, the longitudinal and bottom walls of said reed chambers being integral with each other.

CHARLES H. BENNINGTON.
IRVING L. STEIN.